Nov. 18, 1969  P. J. HARGET ET AL  3,479,631
THERMISTORS
Original Filed Dec. 22, 1965  2 Sheets-Sheet 1
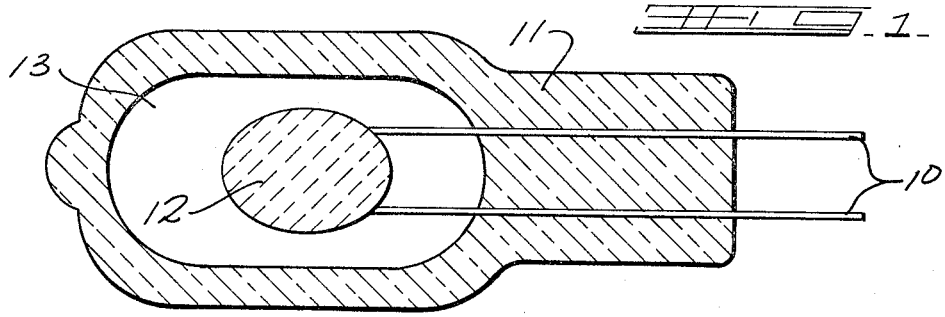
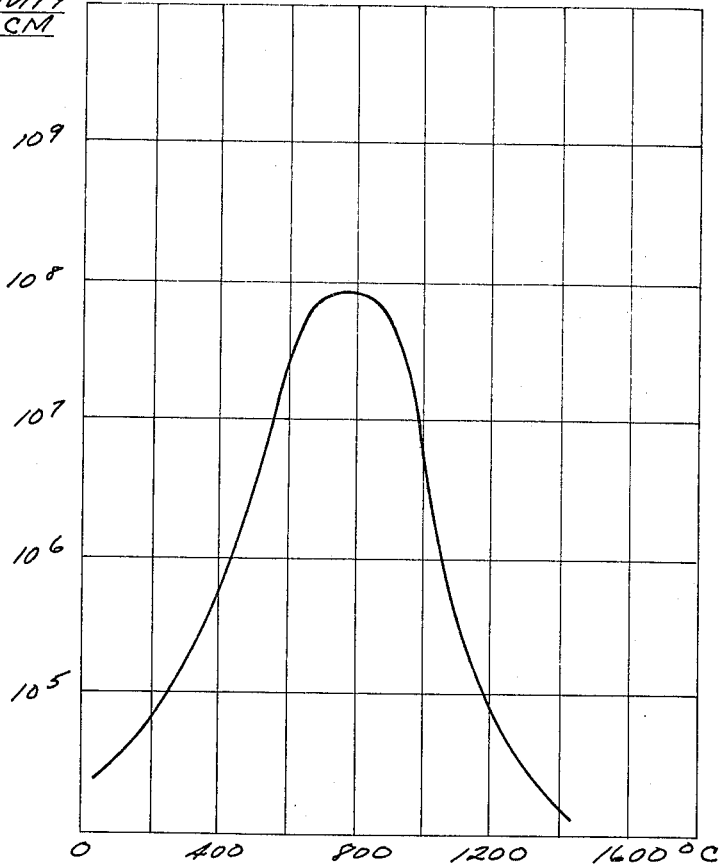
RESISTIVITY OF IRON TITANATE RUTILE COMPOUND AS A FUNCTION OF HEAT TREATMENT TEMPERATURE
INVENTORS
PAUL J. HARGET
DENNIS T. STURGILL
BY W. A. Schaich
and
Richard D. Heberling
ATTORNEYS

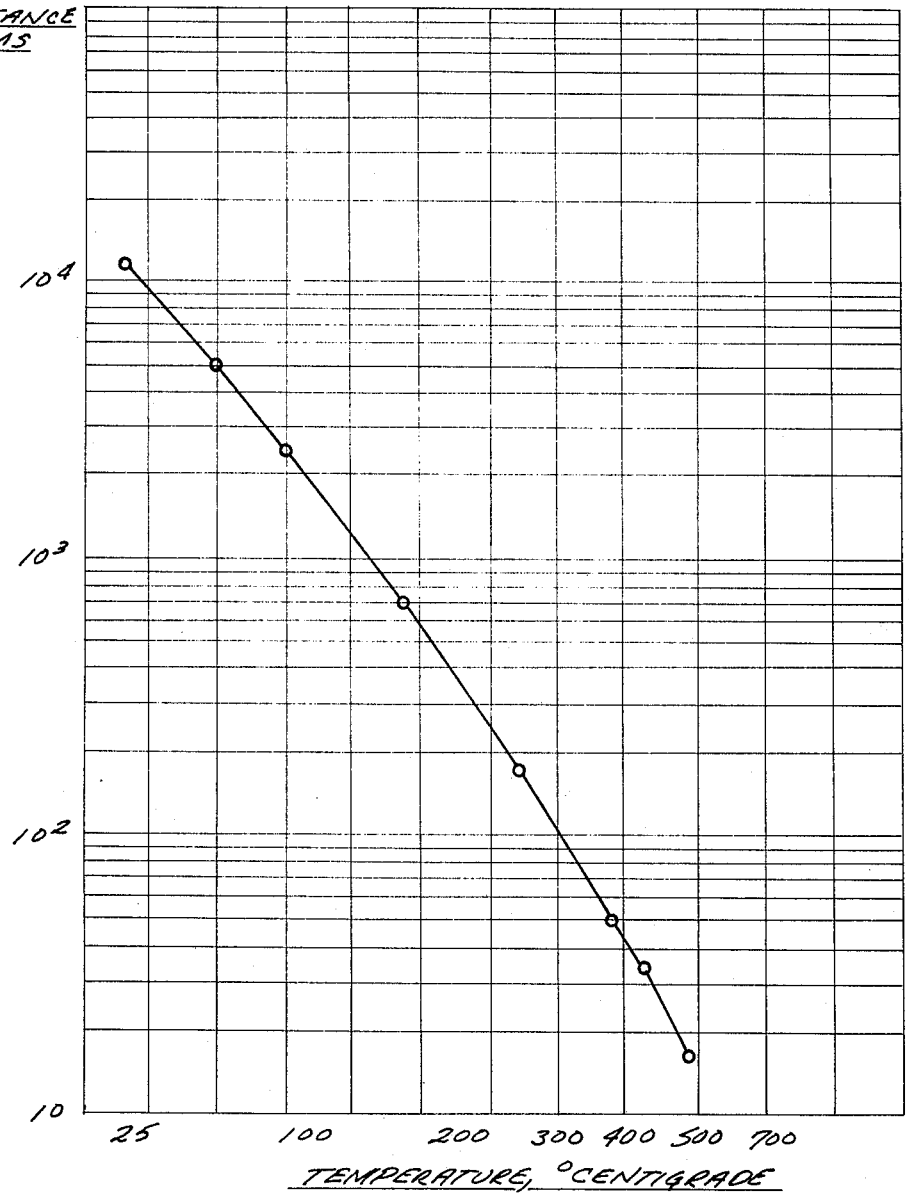

United States Patent Office 3,479,631
Patented Nov. 18, 1969

3,479,631
THERMISTORS
Paul J. Harget, Ann Arbor, Mich., and Dennis T. Sturgill, Toledo, Ohio, assignors to Owens-Illinois, Inc., a corporation of Ohio
Original application Dec. 22, 1965, Ser. No. 515,676, now Patent No. 3,393,448, dated July 23, 1968. Divided and this application Nov. 29, 1967, Ser. No. 716,245
Int. Cl. H01c 7/04
U.S. Cl. 338—22          2 Claims

ABSTRACT OF THE DISCLOSURE

A ferric titanate thermistor device in which a body of ferric titanate is enclosed in a glass envelope. The device is capable of stable operation at temperatures in excess of 600° F.

---

The present application is a divisional of application Ser. No. 515,676, filed Dec. 22, 1965, now Patent 3,398,448, issued July 23, 1968.

The present invention relates to thermistors having desirable high temperature properties. More particularly, the present invention relates to thermistors formed of iron-titanate in rutile titanium oxide and method of preparing the same.

Thermistors are thermally sensitive resistors that exhibit a change in electrical resistance as a function of temperature. Heretofore, thermistors capable of operating at high temperatures have been unattainable. Up to the present time, thermistors were generally fabricated by sintering powdered mixtures of manganese oxide, cobalt oxide, nickel oxide and ferrous-ferric oxide with traces of lithium oxide as a valence adjuster. Previous methods generally required making a mixture of the aforementioned ingredients in the form of a paste using powdered glass or an organic resin as a binder. This paste is then dabbed onto platinum wires or pressed into discs or other desired shapes. The shapes must then be sintered at very high temperatures, e.g., between 1,000° C. and 1350° C. Because of the fact that high sintering temperatures are necessary, the choice of lead wires is usually restricted to platinum or its alloys.

As a result, there has been a need for a thermistor capable of stable operations at elevated temperatures, for example, above about 600° F. Many thermistor manufacturers have been working on this problem and some progress has been made. However, in most instances the electrical properties of thermistors have changed rapidly at temperatures above about 600° F. thereby resulting in unsatisfactory performance.

Accordingly, it is an object of the present invention to provide novel thermistors having desirable properties and characteristics making them suitable for a wide variety of uses.

It is a further object of the present invention to provide thermistors capable of operating at elevated temperatures.

It is a further object of the present invention to provide thermistors capable of stable operation over a large temperature range.

It is a further object of the present invention to provide a method for making thermistors capable of operating at elevated temperatures.

In attaining the above objects, one feature of the present invention resides in forming a thermistor from ferric titanate.

Another feature of the present invention resides in forming a thermistor from a molten composition containing iron and titanium.

A further feature of the present invention resides in providing thermistors by forming a body of ferric titanate and thereafter subjecting the body to a heat treatment to adjust its resistance to the proper level and to obtain stable operating characteristics.

A further feature of the present invention resides in ferroelectric devices prepared from ferric titanate.

The above, as well as other objects, features and advantages of the present invention will become apparent from the following detailed description thereof, taken in conjunction with the drawings wherein:

FIGURE 1 is a completely assembled thermistor devise in accordance with the present invention;

FIGURE 2 is a graph showing the resistivity of iron-titanate-rutile compound as a function of heat treatment temperature; and FIGURE 3 is a graph of a plot of temperature vs. resistance showing characteristics of typical iron-titanate-rutile thermistors of the present invention as a function of heat treatment.

According to the present invention, thermistors are prepared from ferric titanate which are particularly useful for operating at elevated temperatures. Because of their very stable characteristics, thermistors of the present invention can be used for many applications. In carrying out the present invention a mineral composition containing titanium and iron is oxidized to produce the ferric form of iron by roasting or melting an oxidizing atmosphere. A suitable starting material for this purpose is the natural mineral ilmenite containing $FeO \cdot TiO_2$ and some $Fe_2O_3$. The ferrous iron contained therein is oxidized to the ferric state. The resulting product is predominantly ferric titanate ($Fe_2 \cdot TiO_2$) with excess $TiO_2$ as a by-product. It is preferred that the ilmenite be ground to a relatively fine condition; e.g., $-100$ mesh granular powder. The granular mineral is preferably roasted in air at about 2400° F. for a period of time that varies from 16 to 24 hours, thereafter the composition is melted to form a glass or a slag at about 2800° F. and then recrystallized on slow cooling in air. This process results in a virtually complete conversion to the desired product ferric titanate.

The roasted and fused ilmenite forms a solid solution of $Fe_2TiO_5$ with excess $TiO_2$. The two crystalline compounds include a wide variety of solid solution series each with different electrical properties.

It is noted that the foregoing is simply given by way of illustrating the preferred method for obtaining the ferric-titanate present for purposes of the present invention. The procedures set forth can be varied and should not be considered as limiting the present invention.

The ferric-titanate-rutile compound as prepared above is formed as a bead on at least one lead either by flame-working or dipping into the fused material. Thermistor devices can also be formed by pressing or molding the material into cylinders or disks. Leads may be formed of platinum, palladium, stainless steel or any other metal or alloy with a melting temperature greater than 2800° F. The formation can be done in a reducing atmosphere thus eliminating the possibility of lead oxidation. The iron-titanate-rutile compound is soft enough that little problem is encountered in matching thermal expansion characteristics of the lead wires. It will be apparent of course that in order to make a good bond between the glass and the lead wires the coefficients of thermal expansion of the glass and wire should be as close as possible.

After the device, such as shown in FIGURE 1, is formed it is given a low temperature heat-treatment to adjust its resistance to the proper level and to obtain the stable operating characteristics. Generally the heat treatment can vary, but it is preferred that it be performed in an air atmosphere between 200° C. and 700° C. depending upon the final characteristics desired. FIGURE 2 shows the curve of the final resistivity as a function of heat-treatment temperature. It will therefore be apparent that the resistivity can be tailored to meet any suitable requirements by varying the heat treatment temperature. Treatments can also be performed on the back side of the curve, mainly above 700° C., but little advantage is achieved thereby inasmuch as lower temperatures permit the use of metal leads which normally oxidize in the air at higher temperatures. Moreover, as may be seen from FIG. 2 it is possible to obtain the same resistivity characteristic by performing the heat treatment at lower temperatures. It can be seen that the devices may be adjusted approximately 4 orders of magnitude in resistance by using the proper temperature in the above heat treatment. In some cases, the devices held at temperatures long enough to come to complete oxidation equilibrium with the air atmospheres. This normally requires about 16 hours of treatment time. However, shorter time or longer time may be used, from 1 to 20 hours usually being sufficient depending upon the temperature of the desired properties of the end product.

After the heat treatment is completed the device is sealed in a small glass envelope in an air atmosphere. This prevents any further change in the oxidation in the state of the iron-titanate-rutile compound during subsequent heating and cooling cycles. A representative device is shown in FIGURE 1 wherein leads 10 are sealed into glass envelope 11. Iron-titanate-rutile compound 12 is sealed onto the end of the electrical leads. Air 13 fills the chamber in the glass envelope. If desired other gases may be used in the chamber. The glass used in the envelope is selected to match the thermal expansion characteristics of the lead wire. Normally, the highest melting glass with the proper expansions is selected. Satisfactory seals have been made with a variety of metals, for example, platinum and molybdenum. The electrical characteristics of these devices can be adjusted to a straight line $1/T$ curve or to a nonlinear curve useful for nonlinear circuits. A typical curve is shown in FIGURE 3.

Thermistors made in accordance with the present invention, were tested by heating to 932° F. and holding it there for 120 hours. The slope characteristics were measured before and after the test and no measurable changes were found. The temperature was limited to 932° F. because the low softening point of the glass used for the envelope. Thereafter, the thermistors were reheated to 932° F. and 40 ma. direct current passed through it for 120 hours. This amounted to a total charge passage of 17,250 coulombs. Again, no change could be detected in the electrical resistance characteristics, either 932° F. or at room temperature. This is a very severe test and to the best of applicants present knowledge no known thermistor is capable of performing as well.

The devices of the present invention are characterized by a number of advantages including the fact that the materials used are readily available, not expensive and easily controlled. Thermistor resistance characteristics can be varied over 4 or more orders of magnitude with no change in the manufacturing process other than changing the heat treatment temperatures. The upper usable temperature limit for the device depends on a softening point of the glass used for the envelope, approximately 1800° F. represents the usual limits of commercially available glass and the oxidation resistance of the exposed metal leads. The electrical life characteristics of the thermistors of the present invention are superior to those presently available and the process can be varied to produce a wide variety and assortment of nonlinear type thermistors some of which are used to greatly simplify electronic control circuits.

We claim:
1. A thermistor device comprising a shaped body consisting essentially of a solid solution of $Fe_2 \cdot TiO_5$ in excess $TiO_2$, fused onto at least one metal lead and enclosed in a glass envelope and surrounded by air in said envelope, said device being capable of stable operation at temperatures in excess of 600° F.
2. A thermistor device as defined in claim 1 wherein the lead is platinum.

References Cited
UNITED STATES PATENTS

| | | | |
|---|---|---|---|
| 2,407,288 | 9/1946 | Kleimack et al. | 338—23 |
| 2,616,859 | 11/1952 | Verwey | 252—520 |
| 2,735,824 | 2/1956 | Haayman | 252—520 |
| 3,105,800 | 10/1963 | Watanabe. | |
| 3,377,561 | 4/1968 | Sauer | 252—520 X |

REUBEN EPSTEIN, Primary Examiner

U.S. Cl. X.R.
252—520; 338—25